(12) United States Patent
Kuo

(10) Patent No.: US 7,287,453 B2
(45) Date of Patent: Oct. 30, 2007

(54) WOODWORKING TABLE WITH AN AUXILIARY DEVICE

(76) Inventor: Sheng-Hsien Kuo, No. 19, Lane 502, Wen Hsien Rd., Tainan (TW)

( * ) Notice: Subject to any disclaimer, the term of this patent is extended or adjusted under 35 U.S.C. 154(b) by 376 days.

(21) Appl. No.: 11/075,659

(22) Filed: Mar. 10, 2005

(65) Prior Publication Data
US 2006/0201296 A1    Sep. 14, 2006

(51) Int. Cl.
B23D 45/06    (2006.01)

(52) U.S. Cl. .............................. 83/435.15; 83/435.27; 83/473; 83/477.1; 83/477.2

(58) Field of Classification Search ............. 83/435.15, 83/435.27, 473, 477.1, 477.2, 435.11
See application file for complete search history.

(56) References Cited

U.S. PATENT DOCUMENTS

| 4,516,612 | A | * | 5/1985 | Wiley | .......................... | 144/1.1 |
| 5,201,863 | A | * | 4/1993 | Peot | ............................ | 83/432 |
| 5,875,698 | A | * | 3/1999 | Ceroll et al. | .................. | 83/473 |
| 7,240,706 | B2 | * | 7/2007 | Liu et al. | ................. | 144/286.5 |

* cited by examiner

Primary Examiner—Kenneth E. Peterson
(74) Attorney, Agent, or Firm—Rosenberg, Klein & Lee

(57) ABSTRACT

A woodworking table with an auxiliary device to provide fast and precise cutting of a work piece at the angle as desired includes a case and a sawing controller. Adjusting slots and pivoting holes are provided on two sides of the case for the sawing controller to penetrate through and to be pivoted in the case. The sawing controller includes a handle. The handle slides along the adjusting slot to adjust angle and height of a saw blade of the sawing controller. The auxiliary device is for further control of the cutting angle.

8 Claims, 10 Drawing Sheets

US 7,287,453 B2

WOODWORKING TABLE WITH AN AUXILIARY DEVICE

BACKGROUND OF THE INVENTION (a) Field of the Invention

The present invention relates to a woodworking table with an auxiliary device, and more particularly, to one allows control of blade angle to achieve fast and precise sawing at an inclination as desired in conjunction with the auxiliary device.

(b) Description of the Prior Art

The structure of saw blade height and angle controllers of a conventional woodworking table is composed of having a shaft inserted with a suspended board pivoted to where beneath a table in parallel with the saw blade slot is provided. A clamp is provided on one side of the suspension board to limit a bearing board thereon. A motor unit is fixed to the other end of the area limited by the clamp on the bearing board. The spindle of the motor passing through another side of the bearing board to be fixed to the saw blade and the saw blade is merely located at where beneath the saw blade slot. Rotation of the bearing board is done with a bolting post disposed at a selected location on the bearing board, and the bearing board also ascends and descends as pushed by a worm gear. Moving of another worm gear achieves the purpose of tilting the saw blade. Two hand wheels provided to the table are respectively used to control the height and angle of the blade holder to facilitate cutting of wood boards depending on the height and width desired.

However, the structure of the prior art involves too many members resulting in more difficulties in assembly and higher production cost. The transmission of the structure becomes very complicated and thus is vulnerable to higher failure rate since many mechanisms are involved in controlling the height and angle of the saw blade.

SUMMARY OF THE INVENTION

The primary purpose of the present invention is to provide a woodworking table with an auxiliary device that allows summary structure and easy operation with the auxiliary device to facilitate the cutting.

To achieve the purpose, the woodworking table comprises a case and a sawing controller. On each longer sides of the case is provided with an adjusting slot, and a locking slot extending vertically from the lower end of the adjusting slot. A pivoting hole is provided on the case at where in relation to the center of the controller slot. A guide is each provided on two inner sides of the case, corresponding in position to the pivoting hole. A through hole is provided on the guide to receive insertion of a knob to lock the guide to the case. A pivoting lever extends from the guide for the guide to be pivoted to sawing controller. The sawing controller includes a circular saw blade, an adjusting board, a motor unit, and a handle. The saw blade driven by the motor unit is fixed to the adjusting board. A through hole and a locking hole are provided on the side edge of the adjusting board to respectively receive insertion of the pivoting lever of the guide and the handle. By having the adjusting board of the sawing controller incorporated to the guide through the pivoting lever from the guide, and having the handle secured to the adjusting board in relation to the adjusting slot, the handle moves along the adjusting slot to control the operation of the sawing controller.

The auxiliary device adapted to the woodworking table of the present invention includes a guide rail, a guide block, reference fences, inching pieces, and support arms. Wherein, the guide rail is provided with a rule to indicate angle, and the guide block is inserted onto the guide rail. The guide block is provided with a locking member and the reference fences are pivoted to the front of the guide rail while locking members are disposed beneath the guide rail.

The inching piece is provided to the center section of the reference fence for the latter to be indirectly pivoted to the support arm. One end of the support arm is pivoted to the inching piece; and the other end, to the guide block for the support arm and the guide rail to from a mobile and retractable diamond frame. Accordingly, when the guide block slides along the guide rail, the support arms holding against the reference fences to stretch up for an angle indicated by the rule, and the guide block is secured in place on the guide rail by means of the locking members.

DETAILED DESCRIPTION OF THE PREFERRED EMBODIMENTS

Figure 1:
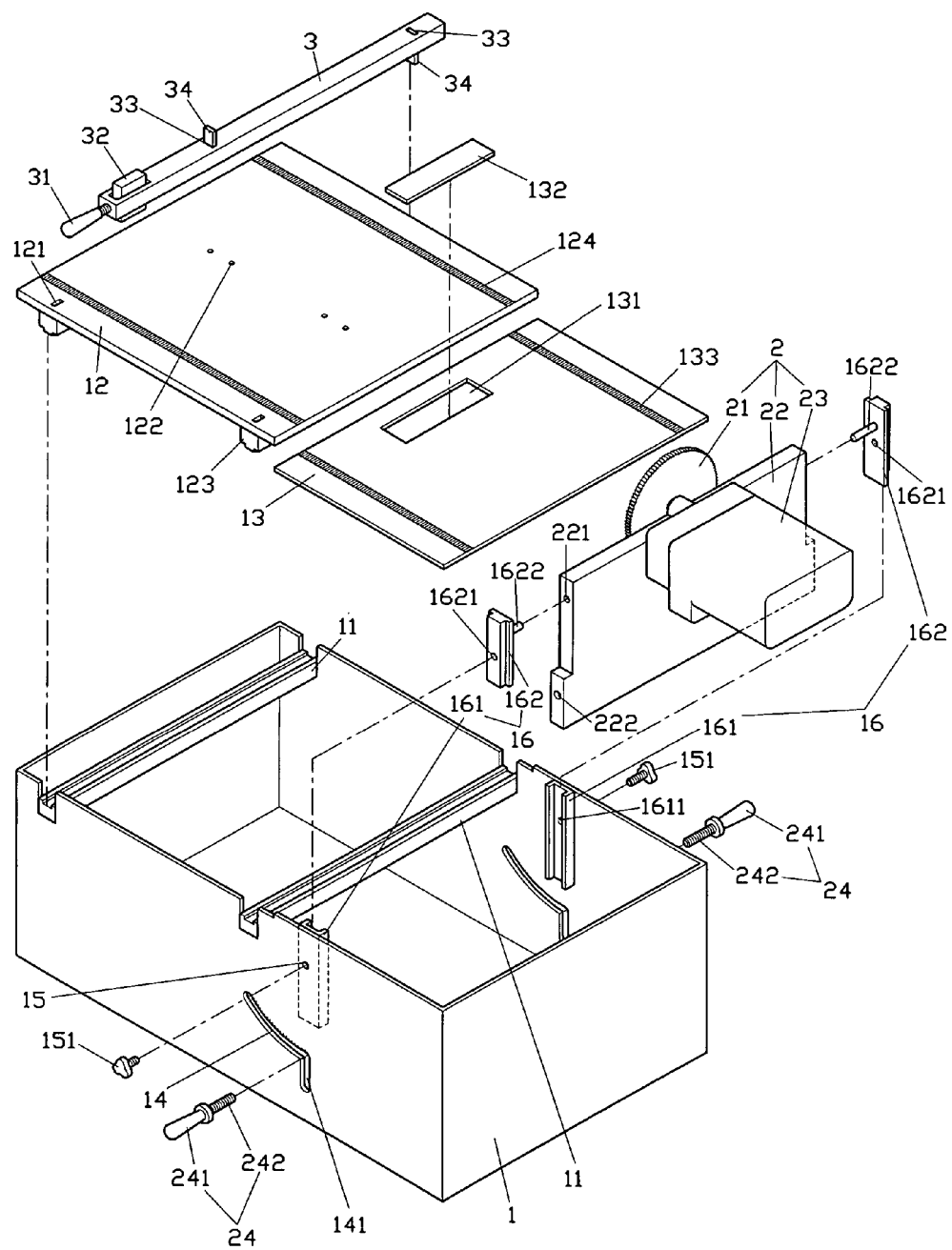
FIG. 1 is an exploded view of the present invention.

Referring to FIG. 1, the present invention comprises a case (1), a sawing controller (2) and a reference fence (3).

The case (1) is an empty box having at its top edge disposed with two tracks (11) for a sliding board (12) to travel thereon and a lid (13) respectively provided on the case (1). Two locking slots (121) are provided on the sliding board (12) close to its edge, and a number of locking holes (122) arranged at equal spacing are provided on the sliding board (12). Two sliding blocks (123) corresponding to the tracks (11) are fixed beneath the sliding board (12). The sliding blocks (123) are inserted into the tracks (11) to slide in relation to the case (1). A slot (131) is provided on the lid (13), and a cover (132) is provided to shut off the slot (131). Rules (124) (133) are respectively provided on both sides of the sliding board (12) and the lid (13). Either side of the case (1) is provided with an adjusting slot (14), a locking slot (141) vertically extending from the lower end of the adjusting slot (14), and a pivoting hole (15) above the adjusting slot (14) and in relation to the center of the adjusting slot (14) for a knob (151) to be inserted through. The inner sides of the case (1) are vertically provided with a pair of guides (16) corresponding in position to the pivoting holes (15). Each guide (16) includes a track (161) and a sliding block (162). Each of the track (161) and the sliding block (162) is disposed with a through hole (1611, 1621) in relation to the pivoting hole (15), and a pivoting lever (1622) extends from the sliding block (1621).

The sawing controller (2) includes a circular saw blade (21), an adjusting board (22), a motor unit (23), and a handle (24). The saw blade (21) is pivoted to the axis of the motor unit (23). Both the saw blade (21) and the motor unit (23) are fixed to the adjusting board (22). A through hole (221) and a locking hole (222) having inner threads are disposed on either shorter edge of the adjusting board (22) to respectively receive insertion of the pivoting lever (1622) and the handle (24). The handle (24) is adapted with a flared grip (241), and a threaded locking section (242) extends from the grip (241).

A packing block (32) driven by a fastener (31) is disposed to one end of the reference fence (3). Two slots (33) are provided on the reference fence (3) to receive insertion of retaining blocks (34).

Figure 2:
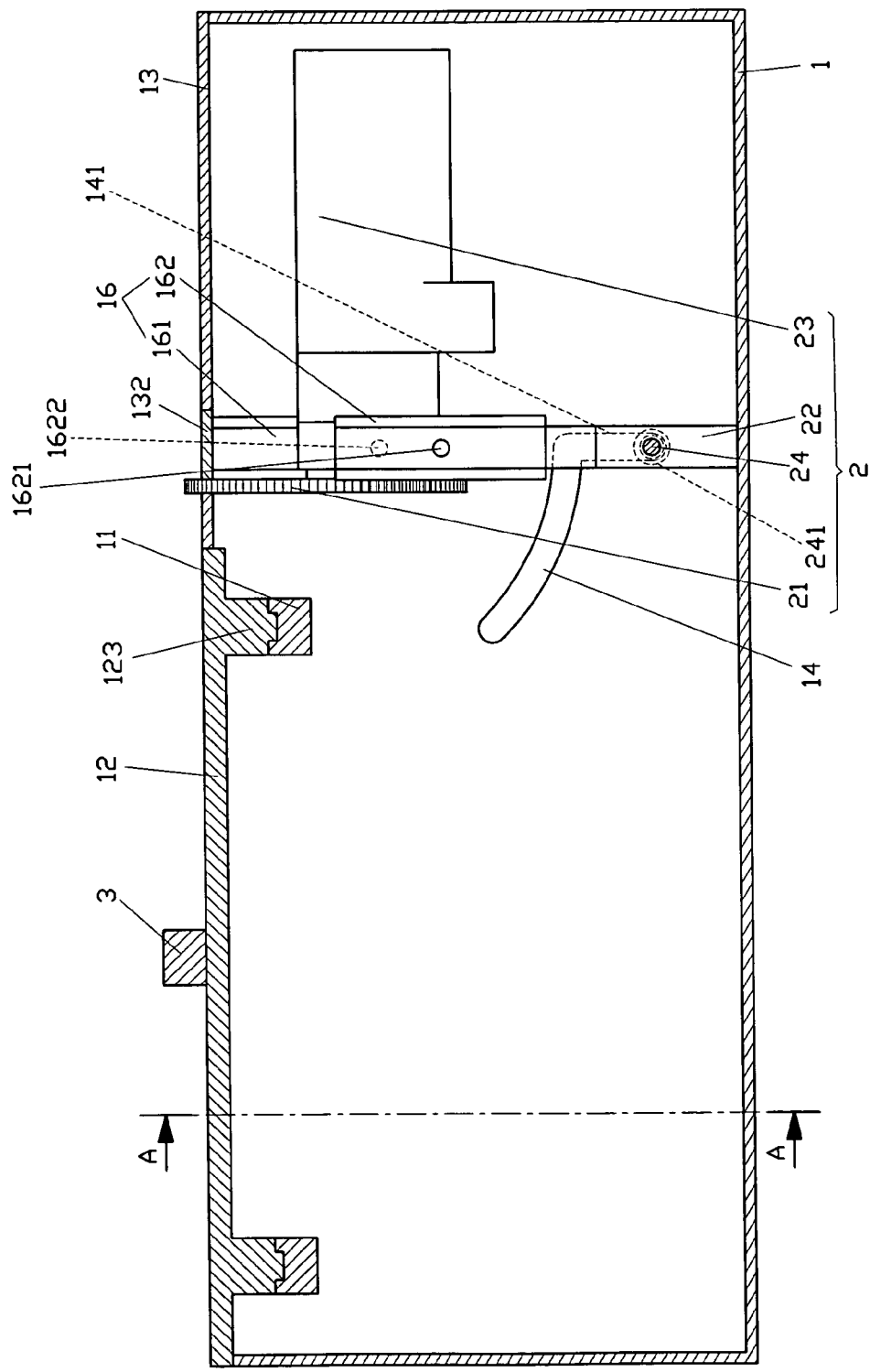
FIG. 2 is a sectional view of the present invention as assembled.
Figure 3:
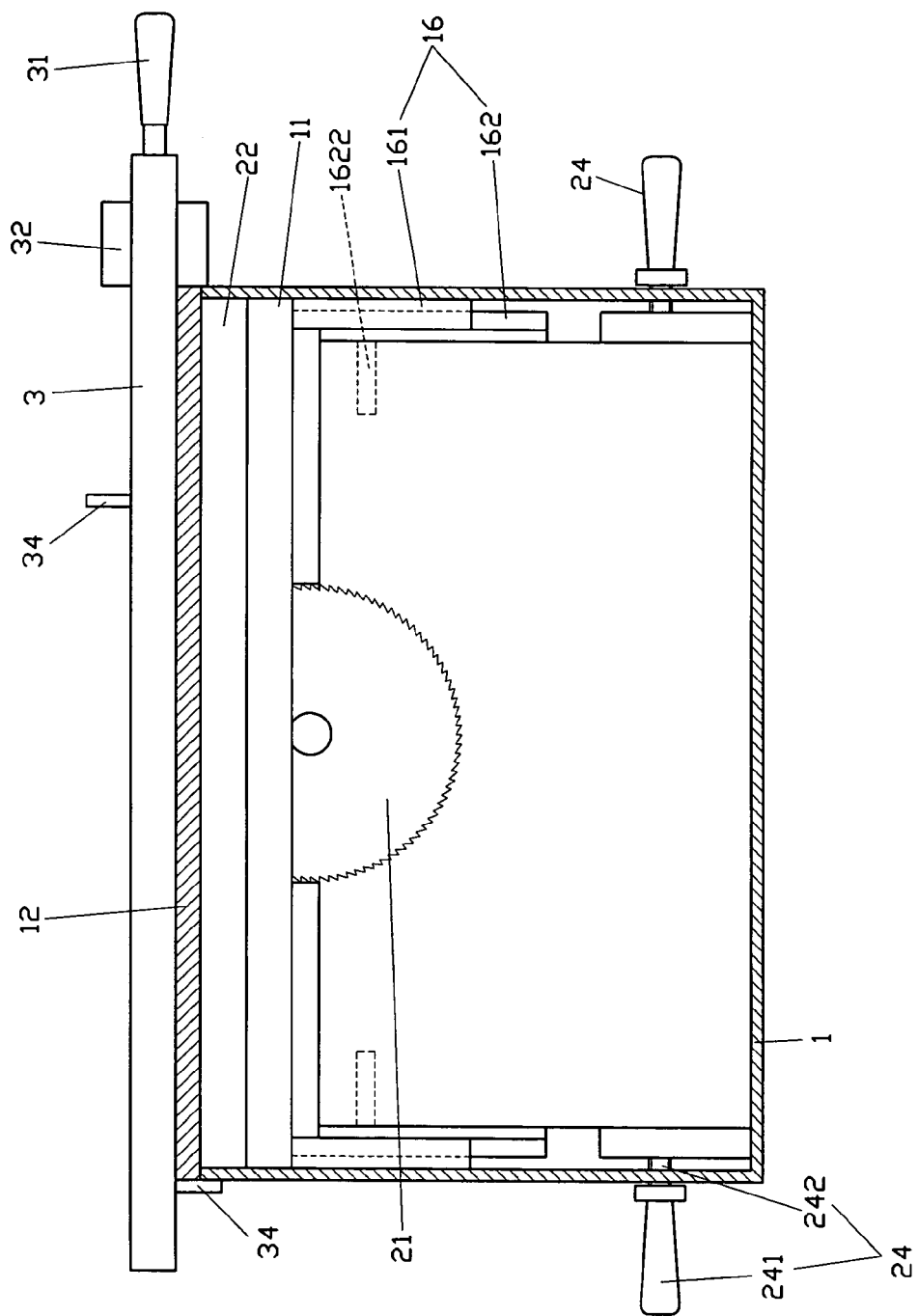
FIG. 3 is a sectional view taken away from A-A in FIG. 2.

In assembly, as illustrated in FIGS. 2 and 3, the sawing controller (2) is placed inside the case (1) so that the adjusting board (22) is inserted into tracks (161) and the sliding blocks (162) with each knob (151) pivoted though the pivoting hole (15), the through hole (1611) of the track (161) and the through hole (1621) of the guide (162) to pivot the sawing controller (2) inside the case (1) while leaving both knobs (151) exposed out of both sides of the case (1). The locking section (242) of the handle (24) is inserted through the adjusting slot (14) and fixed in the locking hole (222) of the adjusting board (22) with the grip (241) tightly holding against the outer side of the case (1). The sliding board (12) is inserted with its sliding blocks (123) to the tracks (11) of the case (1). The lid (13) covers up the case (1) with the circular saw blade (21) exposing out of the slot (131) the case (1). The reference fender (3) has the packing block (32) holding against the side edge of the case (1), while the outer retaining block (34) holds against another side edge of the case (1).

Figure 4:
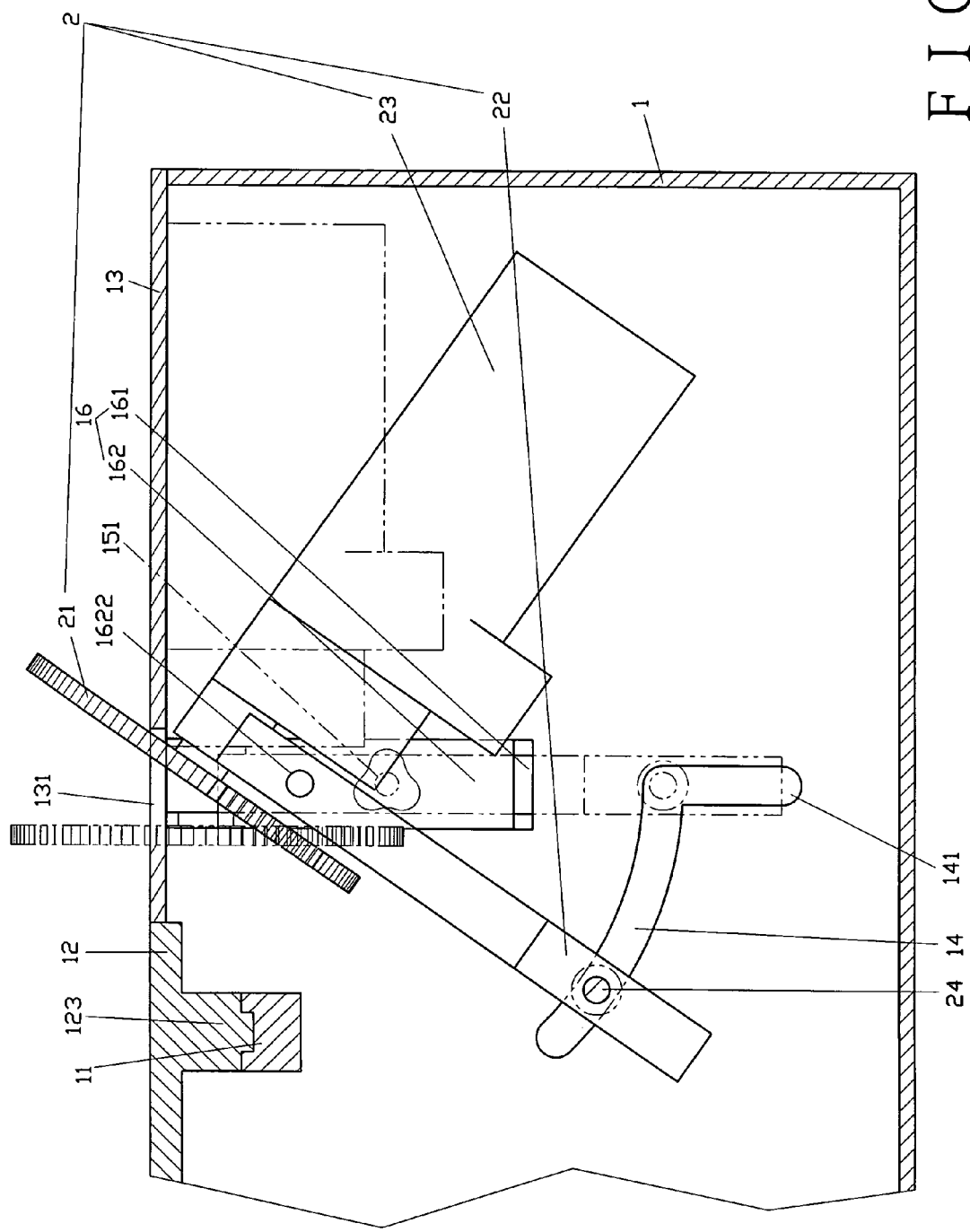
FIG. 4 is a schematic view showing a blade holder of the present invention is lifted.
Figure 5:
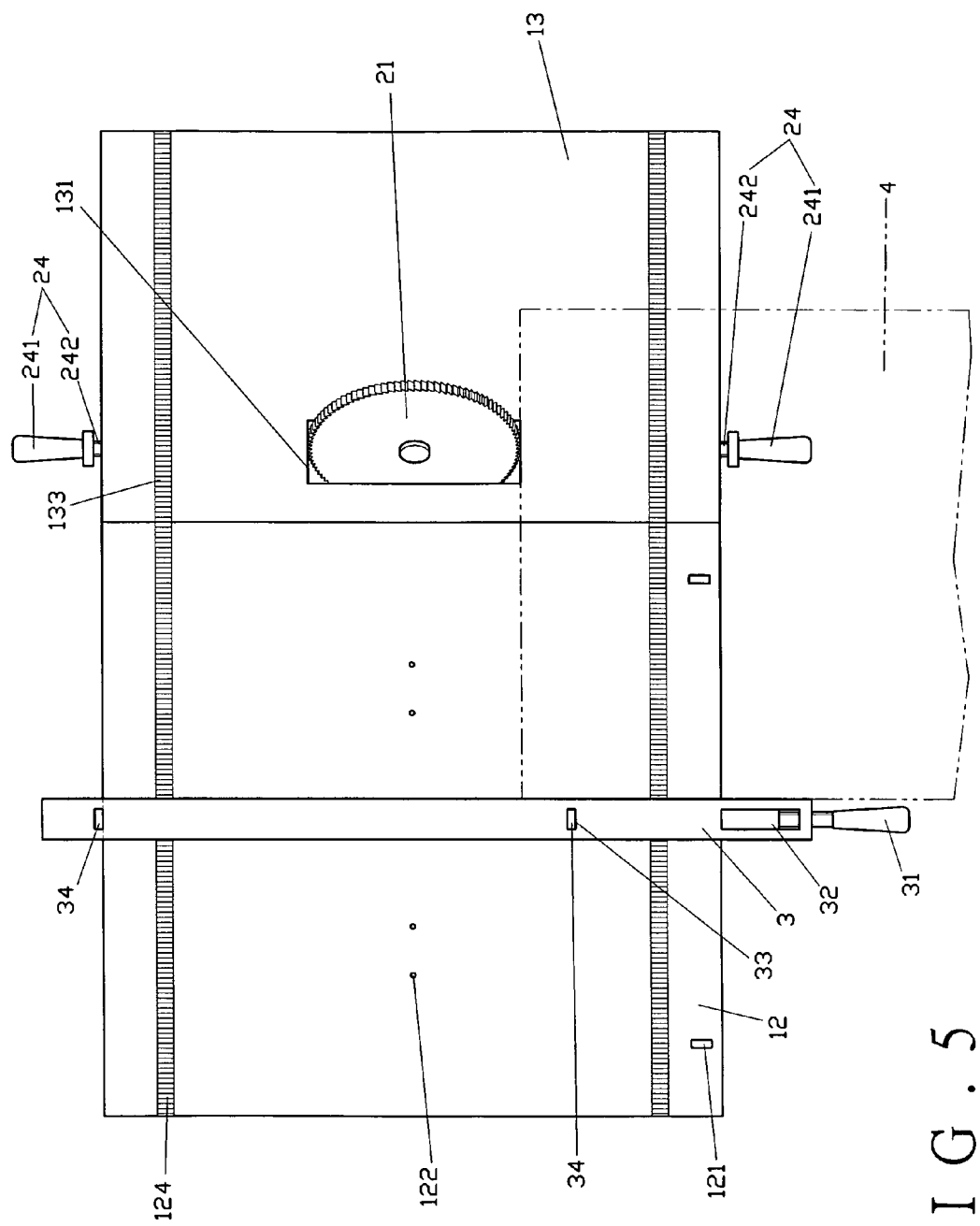
FIG. 5 is a schematic view showing a working status of positioning with a reference fence of the present invention.

In use, as illustrated in FIGS. 4 and 5, the handle (24) is pushed up along the locking slot (141). The knob (151) penetrates through the pivoting hole (15) of the case (1) to pivot the sawing controller (2) to the case (1). With the pivoting lever (1622) as the axle of rotation, the handle (24) slides to a specified point along the adjusting slots (14) respectively provided on both sides of the case (1), and the grip (241) of the handle (24) is tightened up to be secured in position against the case (1), thus for the sawing controller (2) to maintain at a fixed angle. Whereas the edge to the adjusting slot (14) is provided with multiple angle lines, the tilting angle of the saw blade (21) can be easily adjusted; e.g., with the handle (24) moved to 60°, the circular saw blade (21) of the sawing controller (2) equally tilts at 60°. A work piece (4) is then placed on the sliding board (12) of the case (1). Before cutting the work piece (4), the reference fence (3) is placed at a right angle on the sliding board (12) of the case (1). The fastener (31) at one end of the reference fence (3) is tightened up to further tighten up the packing block (32) for the latter to hold against the side edge of the case (1), while the other end of the reference fence (3) holds against another side of the case (1) by the outer retaining block (34). Using the design of the reference fence (3) as the standard for moving the work piece (4), the user may push to move the work piece (4) in relation to the saw blade (21). As guided by the reference fence (3), the work piece (4) maintains advancing in straight line to facilitate the reliable cutting process for the work piece (4). Furthermore, since the saw blade (21) is placed in inclination, the end cut out of the work piece (4) will be one at a certain inclination.

Figure 6:
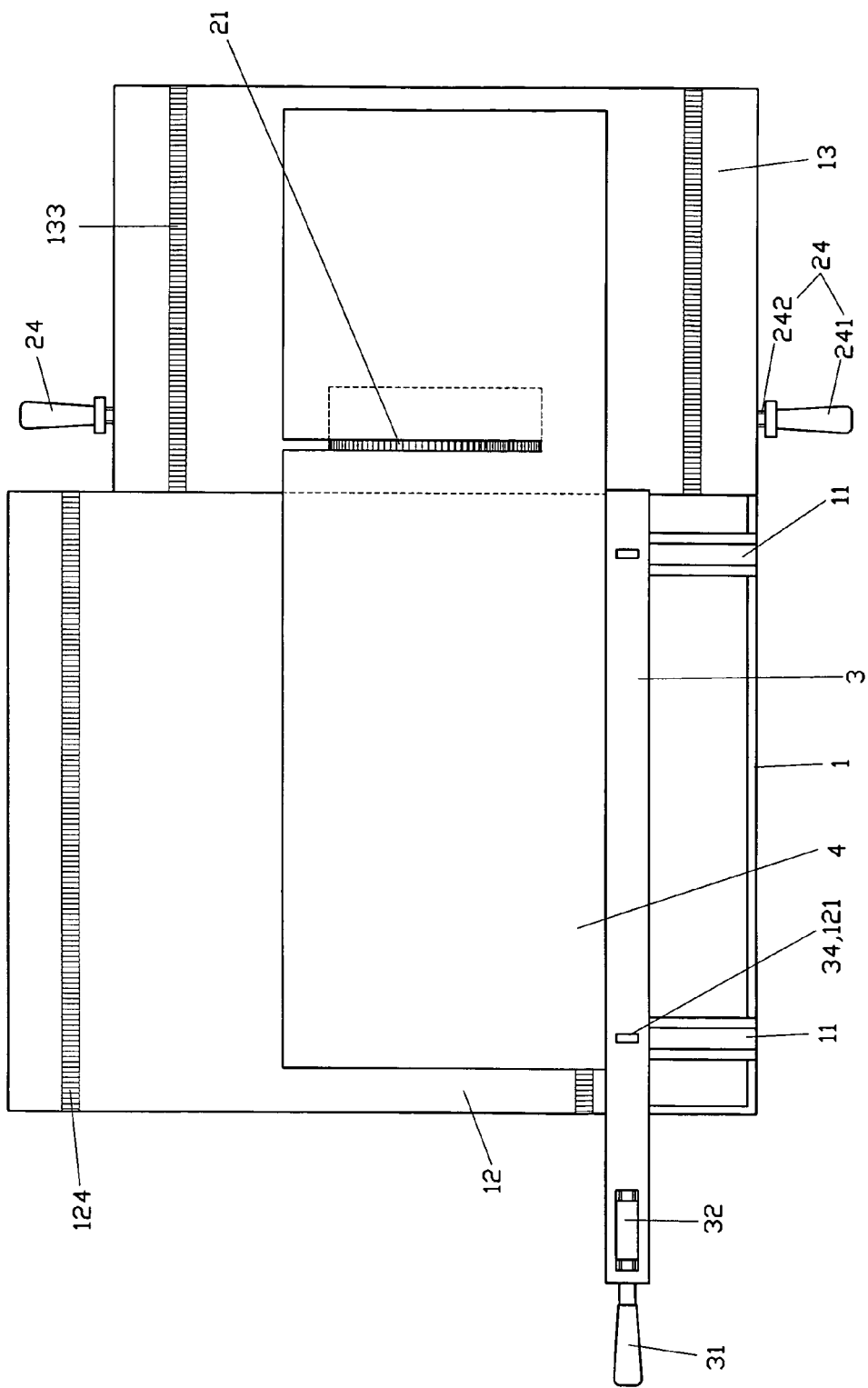
FIG. 6 is a schematic view showing another working status of the present invention.

In normal cutting mode, the saw blade (21) is adjusted by moving the handle (24) to its vertical status and tightened up for the grip (241) to hold against the edge of the adjusting slot (14) (not illustrated) to secure the saw blade (21) in position. As illustrated in FIG. 6, the reference fence (3) is laterally placed on the sliding board (12), and the retaining blocks (34) of the reference fence (3) are secured in the locking slots (121) of the sliding board (12) with the edge of the work piece (4) holding against the side edge of the reference fence (3). The cutting is done by moving both the sliding board (12) and the work piece (4) against the saw blade (21).

Figure 7:
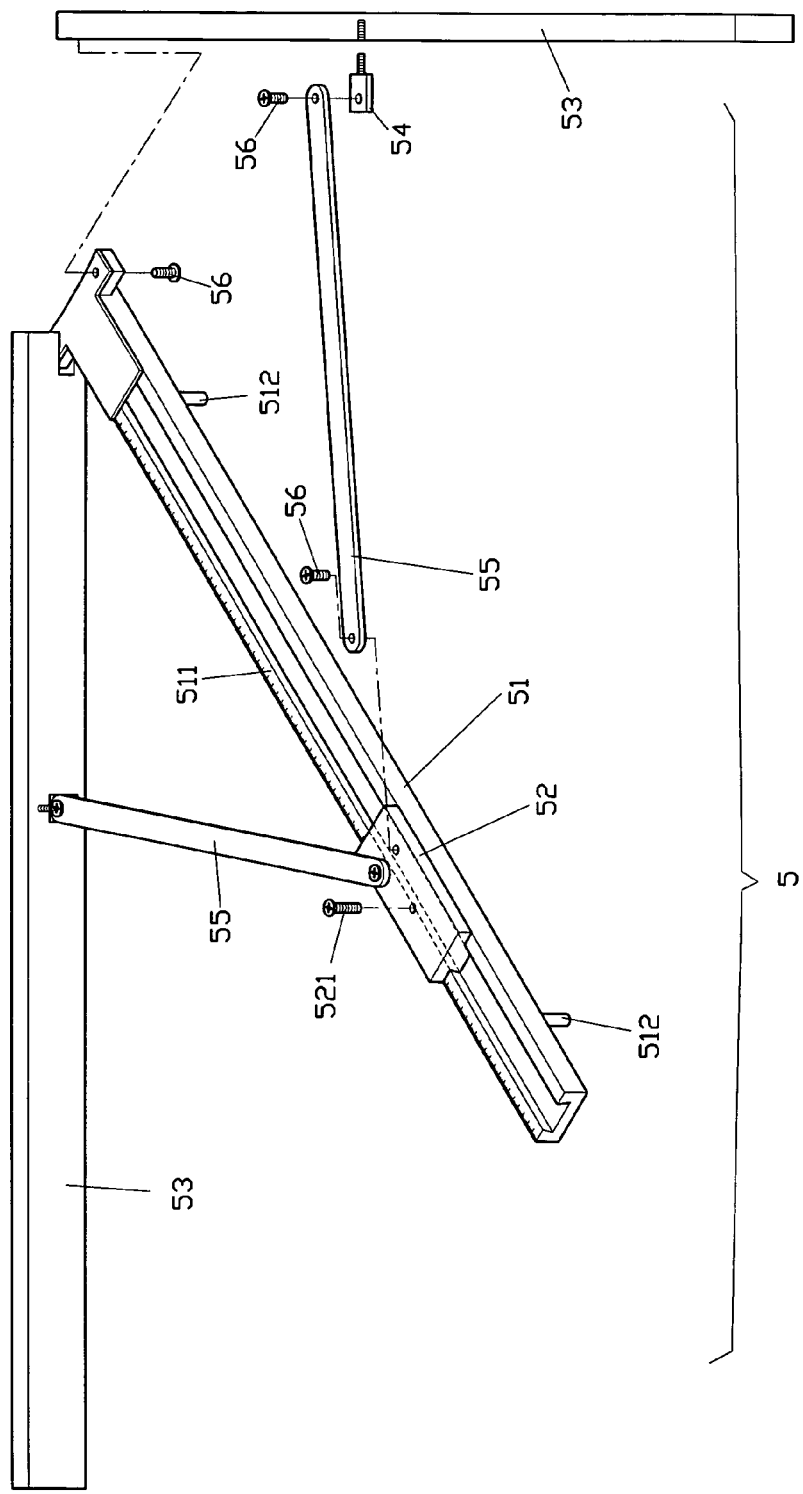
FIG. 7 is a schematic view showing an auxiliary device of the present invention.

An auxiliary device (5) is used in conjunction with the woodworking table to cut a work piece for a slant end and an inclined plane, as illustrated in FIG. 7. The auxiliary device (5) comprises a guide rail (51), a guide block (52), two reference fences (53), inching pieces (54), support arms (55) and bolts (56). A rule (511) indicating angle is provided on the guide rail (51), and two locking members (512) are provided beneath the guide rail (51) in relation to the locking holes (122) of the sliding board (12). The guide block (52) secured to the guide rail (51) is disposed with a locking member (521). The two reference fences (53) are respectively pivoted to the front of the guide rail (51).

The inching piece (54) is independently locked to the middle section on the inner side of the reference fence (53) by means of a bolt (56) for the reference fence (53) to be indirectly pivoted to the support arm (55). One end of the support arm (55) is pivoted to the inching piece (54) and the other end of the support arm (55) is pivoted to the guide block (52) for the guide rail (51) to become a mobile and retractable frame in the shape of a diamond. Accordingly, while the guide block (52) slides along the guide rail (51), the support arm (55) stretches by holding against the reference fences (53) for the relative angle of the reference fences (53) to present the changed angle as indicated by the rule (511). The locking member (521) is then locked to the guide block (52) to secure the guide block (52) on the guide rail (51).

Figure 8:
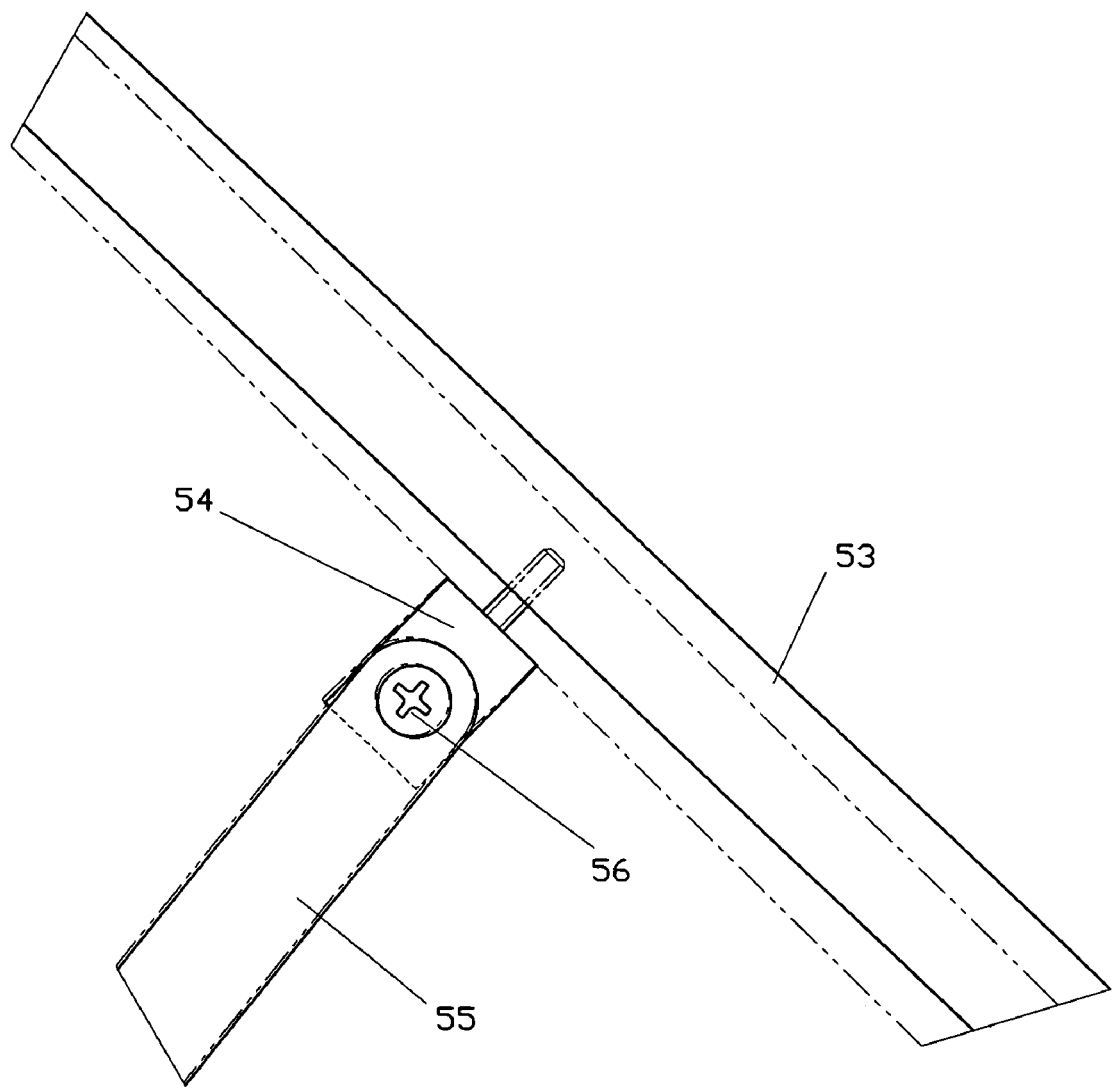
FIG. 8 is a schematic view showing adjustment by the auxiliary device of the present invention.

In case of an unusual angle, such as 151° or 92°, the inching piece (54) disposed on the inner side of each reference fence (53) is used, as illustrated in FIG. 8. By turning the inching piece (54) for the reference fences (53) to relatively stretch up, the angle defined by the reference fences (53) is slightly greater than that present by the rule (511) for inching to the unusual angle.

Figure 9:
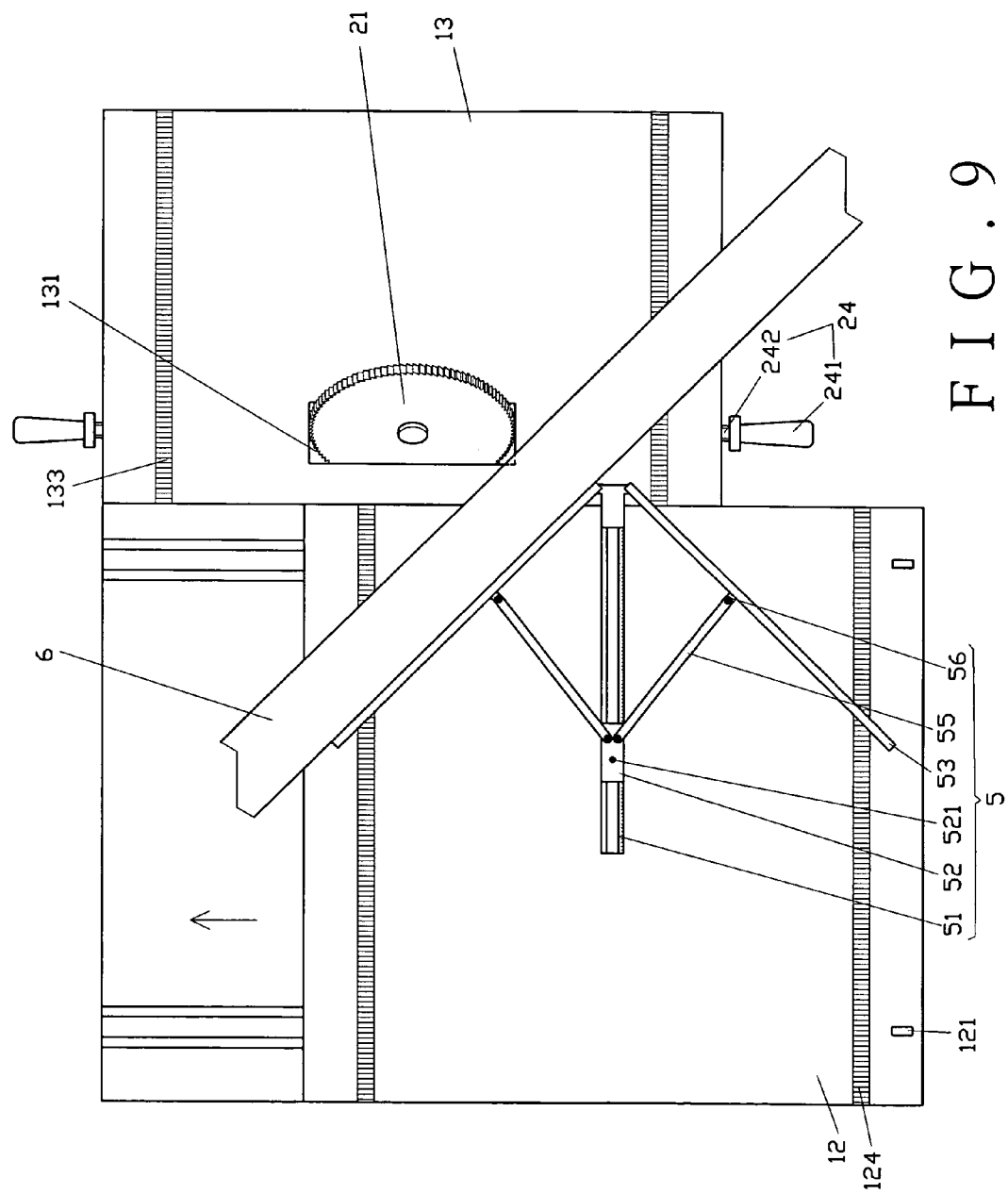
FIG. 9 is a schematic view showing a working status of the auxiliary device of the present invention.

As illustrated in FIG. 9, the location of the guide block (52) on the guide rail (51) is adjusted to determine the angle to be defined by stretching up the reference fences (53) before securing the guide block (52) in position by means of the locking member (521). The angle defined by the stretched reference fences (53) is the cutting angle desired for a work piece (6). The locking members (512) disposed beneath the guild rail (51) are then fixed into the locking holes (122) on the sliding board (12) (not illustrated). The work piece (6) is then directly held against the outer edge of the reference fence (53) and moved together with the sliding board (12) in relation to the saw blade (21) to fast and precisely cut the work piece (6) for an inclined end with a slant.

Figure 10:
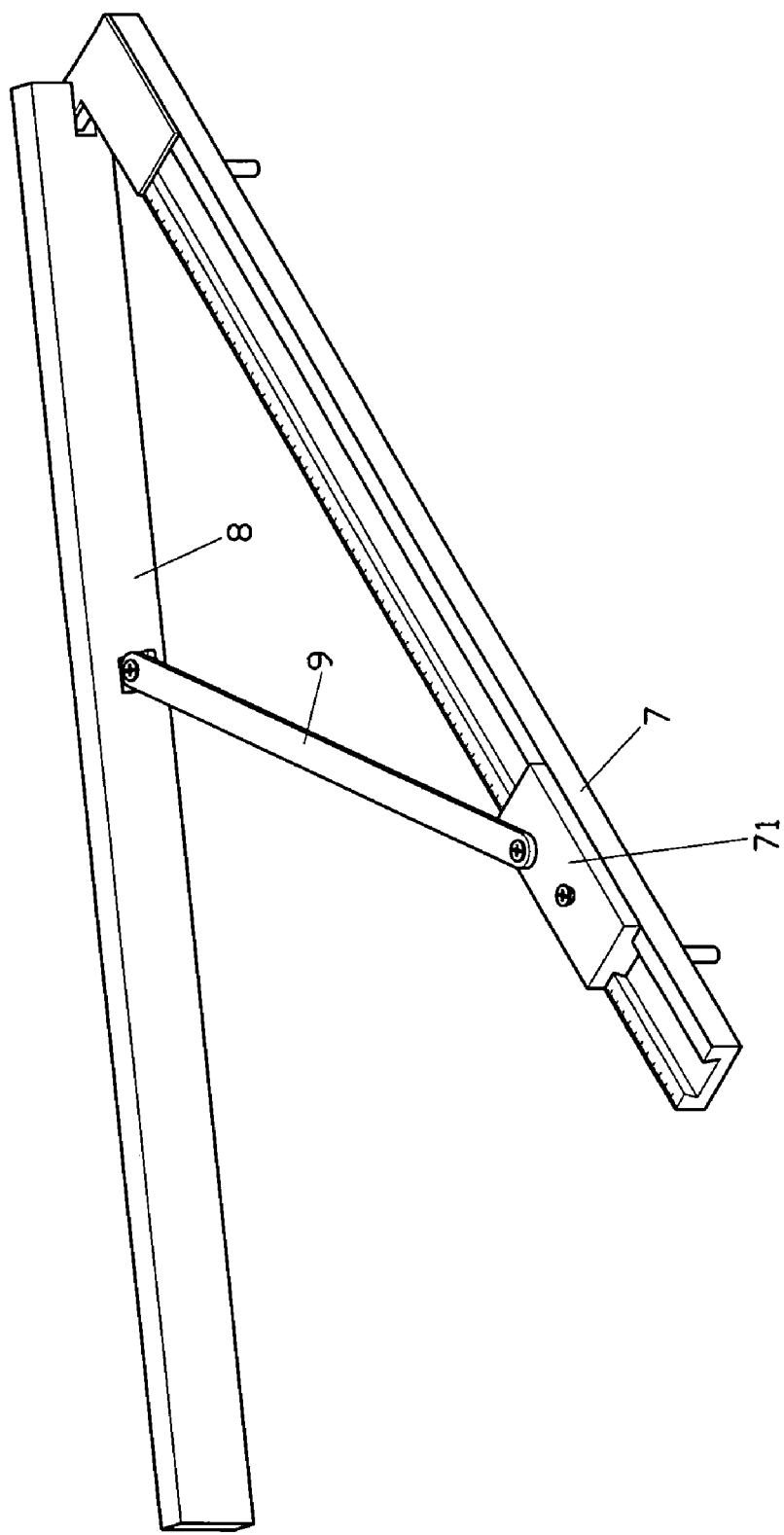
FIG. 10 is a perspective view of another preferred embodiment of the auxiliary device of the present invention.

Now referred to FIG. 10, the auxiliary device is designed to allow one end of a guide rail (7) to be pivoted to a reference fence (8) on one side. A guide block (71) is pivoted to the guide rail (7). The middle section of the reference fence (8) is pivoted to a support arm (9) pivoted to the guide block (71). The work piece (6) (not illustrated) is placed to hold against the reference fence (8) that stretches on one side to achieve the same results as described in the preceding preferred embodiment of the present invention.

I claim:

1. A woodworking table comprising a case and a sawing controller; either side of the case being provided with an adjusting slot, a locking slot vertically extending from a lower end of the adjusting slot and a pivoting hole above the center of the adjusting slot, a guide being each provided on two inner sides of the case, corresponding in position to the pivoting hole, the guide being disposed with a through hole for insertion of a knob, and a pivoting lever extending from the guide; the sawing controller comprising a saw blade, an adjusting board, a motor unit, and a handle, the saw blade being fixed to the adjusting board and driven by the motor unit, and a through hole and a locking hole being provided on the adjusting board to respectively receive insertion of the pivoting lever of the guide and the handle; the adjusting board of the sawing controller being incorporated by means of the pivoting lever of the guide, and the handle penetrating through the adjusting slot and being locked to the adjusting board to control the sawing controller by moving the handle along the adjusting slot.

2. The woodworking table of claim 1, wherein tracks are provided on a top edge of the case for the sliding of sliding blocks of a sliding board, and the sliding blocks travel on the tracks in relation to the case.

3. The woodworking table of claim 2, wherein locking slots are provided on the sliding board of the case to receive insertion of and secure a reference fence in position.

4. The woodworking table of claim 3, wherein one end of the reference fence is provided with a packing block driven by a fastening piece, and slots are provided on the reference fence to receive insertion of retaining blocks.

5. The woodworking table of claim 2, wherein locking holes are provided on the sliding board.

6. The woodworking table of claim 1, wherein a lid is provided on the case, corresponding in position to the sawing controller; a slot being provided on the lid corresponding to the saw blade; and a cover being provided to cover up the slot.

7. The woodworking table of claim 1, wherein the handle is provided with a flared grip; a threaded locking section extends from the grip; and the locking hole of the adjusting board is internally threaded.

8. The woodworking table of claim 1, wherein the guide comprises a track and a sliding block, and the pivoting lever extends from the sliding block to be pivoted to the sawing controller.

* * * * *